(12) United States Patent
Wasynczuk et al.

(10) Patent No.: US 11,201,562 B1
(45) Date of Patent: Dec. 14, 2021

(54) SOFT-SWITCHING VOLTAGE-EDGE-RATE-LIMITING POWER INVERTER

(71) Applicant: Purdue Research Foundation, West Lafayette, IN (US)

(72) Inventors: Oleg Wasynczuk, West Lafayette, IN (US); Minyu Cai, Roseville, MN (US)

(73) Assignee: Purdue Research Foundation, West Lafayette, IN (US)

( * ) Notice: Subject to any disclaimer, the term of this patent is extended or adjusted under 35 U.S.C. 154(b) by 68 days.

(21) Appl. No.: 16/887,013

(22) Filed: May 29, 2020

Related U.S. Application Data

(60) Provisional application No. 62/865,292, filed on Jun. 23, 2019.

(51) Int. Cl.
*H02M 7/48* (2007.01)
*H02M 7/5387* (2007.01)
(52) U.S. Cl.
CPC ....... *H02M 7/4811* (2021.05); *H02M 7/5387* (2013.01); *H02M 7/4815* (2021.05)
(58) Field of Classification Search
CPC .............. H03K 17/122; H02M 1/0058; H02M 7/4811; H02M 7/4815; H02M 7/44
See application file for complete search history.

(56) References Cited

U.S. PATENT DOCUMENTS 5,260,607 A * 11/1993 Kinbara ............... H02M 7/5387
327/427
5,710,698 A * 1/1998 Lai .......................... H02M 1/34
363/56.05

(Continued)

FOREIGN PATENT DOCUMENTS

CN 103701356 A 4/2014
KR 101514803 B1 4/2015

OTHER PUBLICATIONS

K. Shirabe, M. Swamy, J.-K. Kang, M. Hisatsune, M. Das, R. Callanan, and H. Lin, "Design of 400v class inverter drive using sic 6-in-1 power module," in Energy Conversion Congress and Exposition (ECCE), 2013 IEEE. IEEE, 2013, pp. 2363-2370.
J. D. Kagerbauer and T. Jahns, "Development of an active dv/dt control algorithm for reducing inverter conducted emi with minimal impact on switching losses," in Power Electronics Specialists Conference, 2007. PESC 2007. IEEE. IEEE, 2007, pp. 894-900.

(Continued)

*Primary Examiner* — Yusef A Ahmed
(74) *Attorney, Agent, or Firm* — Purdue Research Foundation

(57) ABSTRACT

An auxiliary resonant soft-edge pole inverter circuit is provided. The power inverter circuitry may include a first pair of capacitors in parallel with a corresponding pair of main power switching modules, each power switching module comprising a switch and a diode in parallel and sharing a common central node with the first pair of capacitors. The power inverter circuit may further include a first pair of auxiliary switches connected in series with a first pair of inductors, respectively, to generate resonant current from a DC power source, the first pair of inductors also sharing the common central node. The power inverter circuitry may further include a second pair of auxiliary switches connected in series with a second pair of capacitors, respectively, the second pair of auxiliary switches also sharing the common central node, the circuit producing an alternating current output at the common central node.

6 Claims, 17 Drawing Sheets

(56) References Cited

U.S. PATENT DOCUMENTS

| | | | | |
|---|---|---|---|---|
| 5,946,208 | A * | 8/1999 | Yamamoto | A61B 6/488 363/132 |
| 7,190,600 | B1 * | 3/2007 | Ung | H02M 3/07 363/131 |
| 7,215,040 | B2 * | 5/2007 | Fang | H02M 7/538 307/43 |
| 10,673,318 | B2 * | 6/2020 | Fu | H02M 1/32 |
| 2003/0030632 | A1 * | 2/2003 | Choi | G09G 3/2965 345/211 |
| 2006/0290610 | A1 * | 12/2006 | Moon | G09G 3/2965 345/68 |
| 2009/0219006 | A1 * | 9/2009 | Gekinozu | H02M 3/1582 323/304 |
| 2010/0246231 | A1 * | 9/2010 | Sirio | H02M 7/538 363/132 |
| 2010/0301831 | A1 * | 12/2010 | Krause | H02M 7/5387 323/311 |
| 2011/0096581 | A1 * | 4/2011 | Hallak | H02M 7/5387 363/132 |
| 2012/0086350 | A1 * | 4/2012 | Lin | H05B 41/28 315/200 R |
| 2012/0294056 | A1 * | 11/2012 | Temesi | H03K 17/08128 363/131 |
| 2013/0094260 | A1 * | 4/2013 | Martini | H02M 7/49 363/97 |
| 2014/0319919 | A1 * | 10/2014 | Fu | H02M 7/539 307/82 |
| 2016/0329828 | A1 * | 11/2016 | Zhang | H02M 1/08 |
| 2017/0163153 | A1 * | 6/2017 | Lin | H02M 3/158 |
| 2018/0076628 | A1 * | 3/2018 | Fu | H02J 3/383 |
| 2018/0145606 | A1 * | 5/2018 | Wu | H02M 7/487 |
| 2018/0241320 | A1 * | 8/2018 | Wang | H02M 7/483 |
| 2019/0199226 | A1 * | 6/2019 | Huang Zhan | H02J 7/02 |
| 2020/0076301 | A1 * | 3/2020 | Zhuang | H02M 1/32 |
| 2020/0287461 | A1 * | 9/2020 | Zou | H02M 3/33569 |
| 2021/0067039 | A1 * | 3/2021 | Huang | H02M 1/32 |
| 2021/0126554 | A1 * | 4/2021 | Bianda | H02M 7/5387 |

OTHER PUBLICATIONS

R. W. De Doncker and J. Lyons, "The auxiliary resonant commutated pole converter," in Industry Applications Society Annual Meeting, 1990., Conference Record of the 1990 IEEE. IEEE, 1990, pp. 1228-1235.

F. Engelkemeir, A. Gattozzi, J. Herbst, R. Hebner, and G. Hallock, "Experimental investigation of the performance of two new types of soft-switching power converters for electric ships," in Electric Ship Technologies Symposium (ESTS), 2015 IEEE. IEEE, 2015, pp. 261-267.

M. Nakamura, T. Yamazaki, Y. Fujii, T. Ahmed, and M. Nakaoka, "A novel prototype of auxiliary edge resonant bridge leg link snubber-assisted soft-switching sine-wave pwm inverter," Electrical Engineering in Japan, vol. 155, No. 4, pp. 64-76, 2006.

* cited by examiner

SOFT-SWITCHING VOLTAGE-EDGE-RATE-LIMITING POWER INVERTER

CROSS-REFERENCE TO RELATED APPLICATIONS

This application claims the benefit of U.S. Provisional Application No. 62/865,292 filed Jun. 23, 2019, the entirety of which is hereby incorporated by reference.

STATEMENT REGARDING GOVERNMENT FUNDING

This invention was made with government support under DE-EE0005568 awarded by the Department of Energy. The government has certain rights in the invention.

TECHNICAL FIELD

The present application relates to DC-to-AC power inverters, and more specifically, to soft-switching inverters.

BACKGROUND

Switch-mode DC-to-AC inverters are widely used in variable-speed motor drive systems and other applications. To increase switching frequency and reduce switching loss, power switches have been made faster in the past decades. The switching times of insulated-gate bipolar transistors (IGBTs) have reduced to tens of nanoseconds, while those of wide-bandgap (WBG) devices, such as Silicon Carbide and Gallium Nitride devices, have reduced to several nanoseconds.

As switches are made faster, the inverter output voltage edge rate (dv/dt) becomes larger. Various deleterious effects have been experienced and documented since the introduction of IGBTs. These problems include overvoltages at the motor/inverter terminals, electromagnetic interference, large common-mode currents, and the failure of motor bearings due to induced micro-arcs. To reduce the occurrence of problems resulting from high dv/dt, some standards have been established that limit the dv/dt going into motor drives, among which the US National Electrical Manufacturers Association (NEMA) MG1 Part 31 is commonly observed in the US.

Conventional dv/dt-limiting methods include increasing the external gate resistance or Miller capacitance of the switches, and adding a dv/dt filter between the inverter and the motor. All of these methods, especially the dv/dt filter, can effectively reduce the dv/dt but will introduce extra losses, size and weight of the system.

Soft-switching inverters that are originally developed to reduce switching loss can also limit the dv/dt in the circuits. They can possibly replace the dv/dt filter which may result in reduction in total loss and size/weight. Among various soft-switching inverter topologies, the auxiliary resonant commutated pole (ARCP) inverter and its variants are suitable for variable-speed motor drive systems because they have full pulse width modulation (PWM) control capabilities. The original ARCP inverter can realize zero-voltage switching (ZVS) and zero-current switching (ZCS) in its main and auxiliary switches, respectively. However, it has several drawbacks. First, the necessary mid-voltage point requires extra balancing circuits. Secondly, a boost current needs to be generated, which requires accurate current sensing and/or switch triggering, and results in complicated control. Thirdly, the reverse-recovery current of the auxiliary diodes will induce a large voltage across the auxiliary switches. Therefore, snubbers or voltage-clamping circuits are required, which generate extra losses. To eliminate these drawbacks, some variants of the ARCP were proposed over the past decades.

One approach to improve the ARCP is to use a transformer or coupled inductor. A topology described in J. D. Herbst, F. D. Engelkemeir, and A. L. Gattozzi, "High power density and high efficiency converter topologies for electric ships," in Proc. IEEE Electric Ship Technol. Symp. (ESTS), April 2013, pp. 360-365 uses a 1:1 transformer to create a virtual mid-voltage point, and the auxiliary switches only conduct half of the resonant current. However, the transformer needs to be reset after each switching cycle by extra circuits. A transformer-assisted resonant pole inverter is proposed in X. Yuan and I. Barbi, "Analysis, designing, and experimentation of a transformer-assisted pwm zero-voltage switching pole inverter," IEEE Trans. Power Electron., vol. 15, no. 1, pp. 72-82, January 2000. Its transformer has a turns ratio different from one so the boost current is not required, which makes control simpler. The transformer current can be properly reset. However, the transformer is bulky and its leakage inductance is part of the resonant inductor which makes parameter design more challenging.

The other approach to improve the ARCP is represented by the auxiliary resonant pole (ARP). The ARP connects the resonant inductor to the upper or lower DC bus through auxiliary switches so it does not need a mid-voltage point. Due to this configuration, the boost current is not required, and the auxiliary switch turn-on and the main switch turn-off can be triggered at the same time, which makes control simpler. In addition, the transient voltage across auxiliary switches is clamped to the DC-bus voltage by auxiliary diodes. However, there are still some drawbacks with the ARP inverter. The auxiliary switches have lossy hard-switched turn-off. In addition, there may be a circulating current in the auxiliary circuits when a main switch module is conducting continuously, which again generates loss. A circuit proposed in W. Yu, J. S. Lai, and S. Y. Park, "An improved zero-voltage switching inverter using two coupled magnetics in one resonant pole," IEEE Trans. Power Electron., vol. 25, no. 4, pp. 952-961, April 2010 uses two coupled magnetics as resonant inductors so the circulating current can be prevented. However, the turn-off transients of the auxiliary switches are not perfect ZCS because of the remaining magnetizing current. Therefore, improvements are needed in the field.

The active auxiliary edge resonant pole (AAERP) (see M. Nakamura, T. Yamazaki, Y. Fujii, T. Ahmed, and M. Nakaoka, "A novel prototype of auxiliary edge resonant bridge leg link snubber-assisted soft-switching sine-wave PWM inverter," Elect. Eng. Jpn., vol. 155, no. 4, pp. 64-76, 2006) and the double ARCP (DARCP) (see E. Chu, X. Zhang, and L. Huang, "Research on a novel modulation strategy for double auxiliary resonant commutated pole soft-switching inverter with the shunt dead time," IEEE Trans. Power Electron., vol. 31, no. 10, pp. 6855-6869, October 2016.) improve upon ARP by adding a second pair of capacitors to realize ZVS turn off in the auxiliary switches. However, the second pair of capacitors may not be precharged to the DC-bus voltage, so the output dv/dt may sometimes be large.

BRIEF DESCRIPTION OF THE DRAWINGS

In the following description and drawings, identical reference numerals have been used, where possible, to designate identical features that are common to the drawings.

The attached drawings are for purposes of illustration and are not necessarily to scale.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because data-manipulation algorithms and systems are well known, the present description will be directed in particular to algorithms and systems forming part of, or cooperating more directly with, systems and methods described herein. Other aspects of such algorithms and systems, and hardware or software for producing and otherwise processing the signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

The present disclosure provides a soft-switching circuit to control an inverter output dv/dt with less loss, size and weight than prior-art dv/dt limiting methods, while eliminating the drawbacks of prior-art soft-switching circuits. A circuit topology is provided, referred to herein as an auxiliary resonant soft-edge pole (ARSEP) inverter that realizes soft-switching in all of the main and auxiliary switches and ensures that the inverter dv/dt is limited by circuit parameters. The second pair of resonant capacitors will always be fully pre-charged so the inverter dv/dt can be well-controlled.

Figure 1:
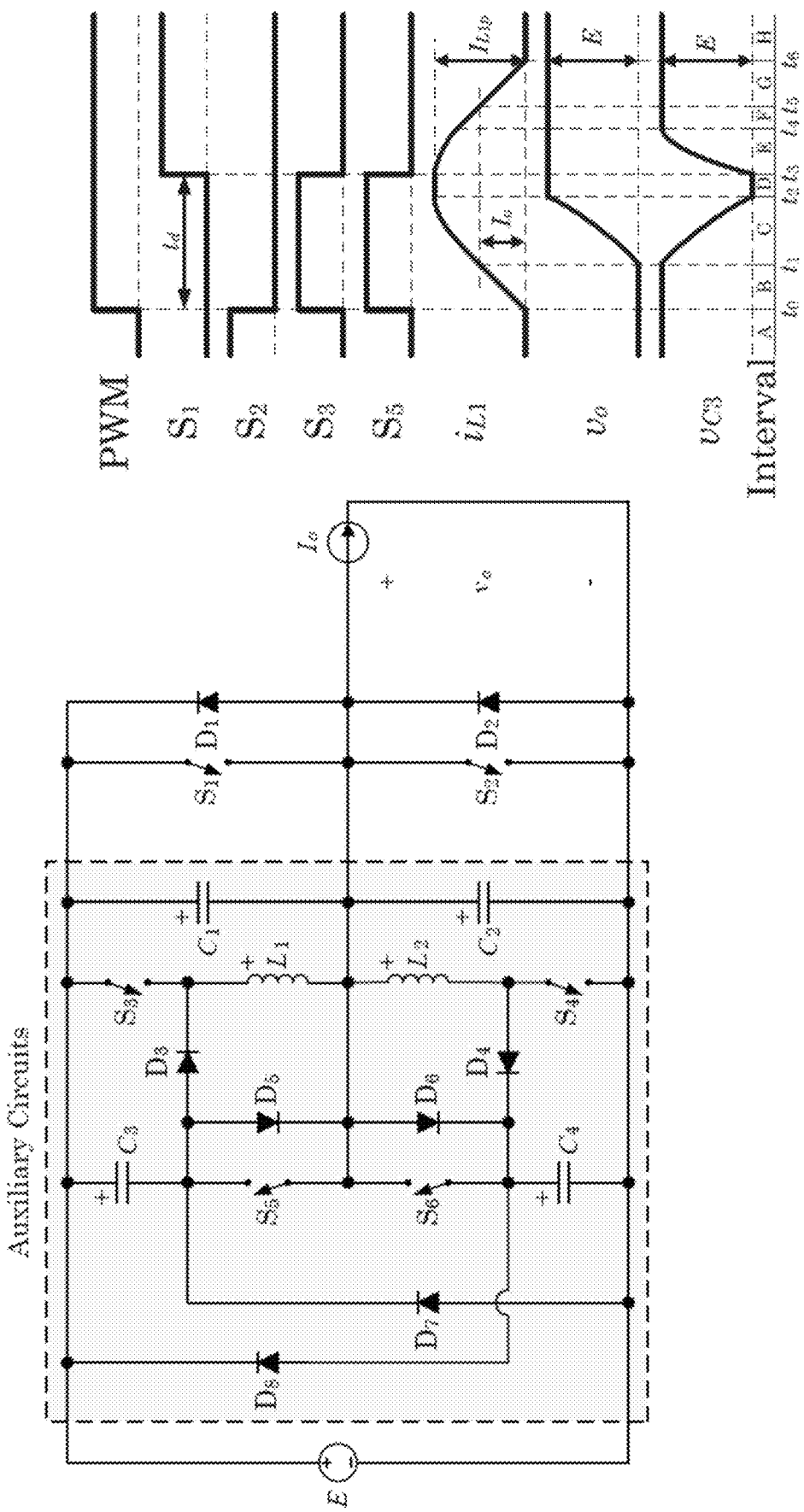
FIG. 1 is a schematic and timing diagram illustrating an auxiliary resonant soft-edge pole inverter circuit according to various aspects.

One embodiment of a single-phase ARSEP inverter is shown in FIG. 1, in which auxiliary circuits are illustrated using a dashed box. Capacitors $C_1$ and $C_2$ are connected in parallel with the main switch modules $S_1/D_1$ and $S_2/D_2$. Auxiliary switches $S_3$ and $S_4$ are connected in series with inductors $L_1$ and $L_2$ to generate resonant current.

It is notable that $S_3$ and $S_4$ are unidirectional to prevent circulating current. Capacitors $C_3$ and $C_4$ have two roles. When $S_5$ ($S_6$) is on, $C_3$ ($C_4$) facilitates soft-switching of the main switches; when $S_5$ ($S_6$) is off, $C_3$ ($C_4$) and $D_3$ ($D_4$) serve as the turn-off snubber of $S_3$ ($S_4$). Diodes $D_5$ and $D_6$ enable pre-charging of $C_3$ and $C_4$, which prepares them for the next resonant process so that the dv/dt is well-controlled by circuit parameters. Diodes $D_7$ and $D_8$ direct residue energy in $L_1$ and $L_2$ back to the power source. It is assumed that $C_1=C_2=C_a$, $C_3=C_4=C_b$, and $L_1=L_2=L$. The "+" signs in FIG. 1 define the ports where positive current goes into the devices.

Output Current Jo may be constant during commutation. Since inverter operation is symmetric for positive and negative output current $I_o$, without losing generality, the circuit operation with a positive output current ($I_o>0$) will be explained in the following subsections. The output current is generally constant during the commutation because the commutation time is relatively short.

A. Diode-to-Switch Commutation

A commutation in which the output current $I_o$ commutes from a diode to a switch is called a diode-to-switch (D2S) commutation.

Figure 2A:
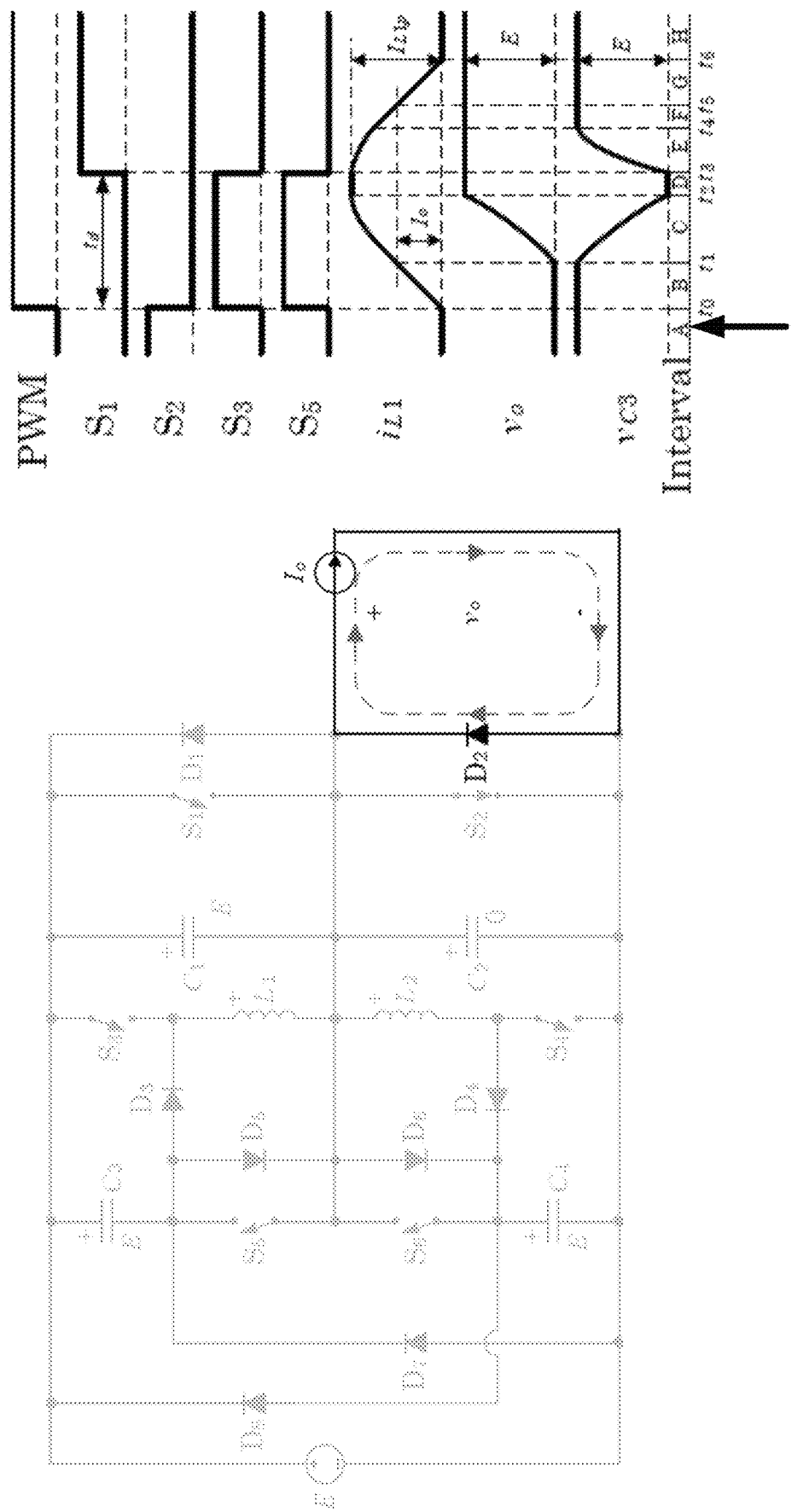
FIG. 2A is a schematic and timing diagram illustrating operation of a power inverter in a diode-to-switch (D2S) commutation during time Interval A according to various aspects.

Interval A (t<$t_0$): Initially, $S_2$ is ON while $D_2$ actually conducts 1A (FIG. 2A). Voltages $v_{C1}=E$, $v_{C2}=0$, and $v_{C3}=E$ due to the presence of $D_5$. In order to demonstrate the basic operation of the circuit, it is assumed that $C_4$ is initially pre-charged, i.e., $v_{C1,0}=E$. The situation where $v_{C4,0}<E$ will be discussed further below.

Figure 2B:
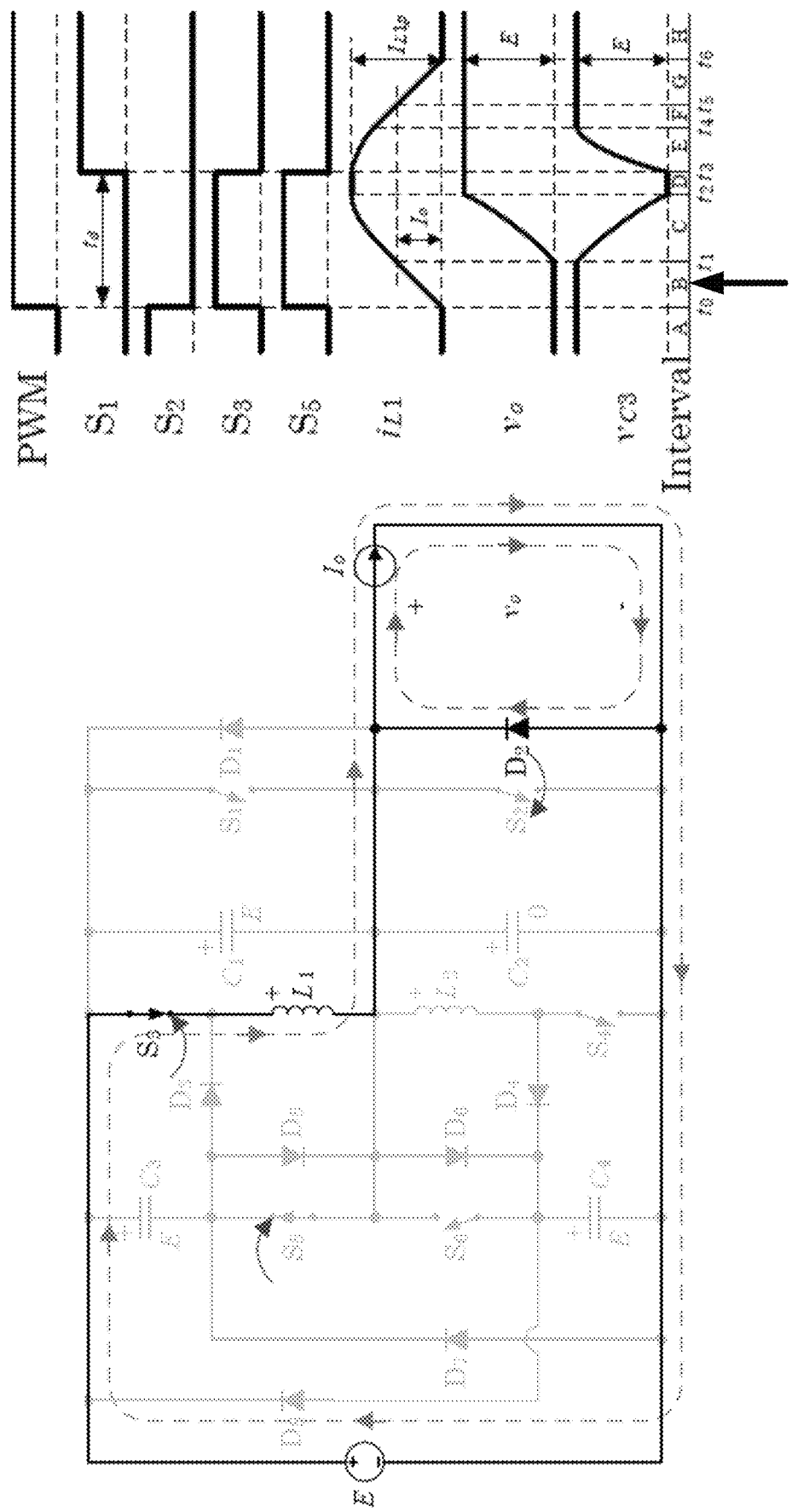
FIG. 2B is a schematic and timing diagram illustrating operation of a power inverter in a D2S commutation during time Interval B according to various aspects.

Interval B ($t_0 \le t<t_1$): At $t_0$, a D2S commutation is commanded. Switch $S_2$ is turned off while $S_3$ and $S_5$ are turned on (FIG. 2B). Since $D_2$ is conducting, $S_2$ is turned off with zero-voltage-zero-current switching (ZVZCS). Since $i_{L1}(t_0)=0$, $S_3$ is turned on with ZCS. Since $v_{C3}(t_0)=E$, $S_5$ is turned on with ZVZCS. Current $i_{L1}$ increases substantially linearly.

Figure 2C:
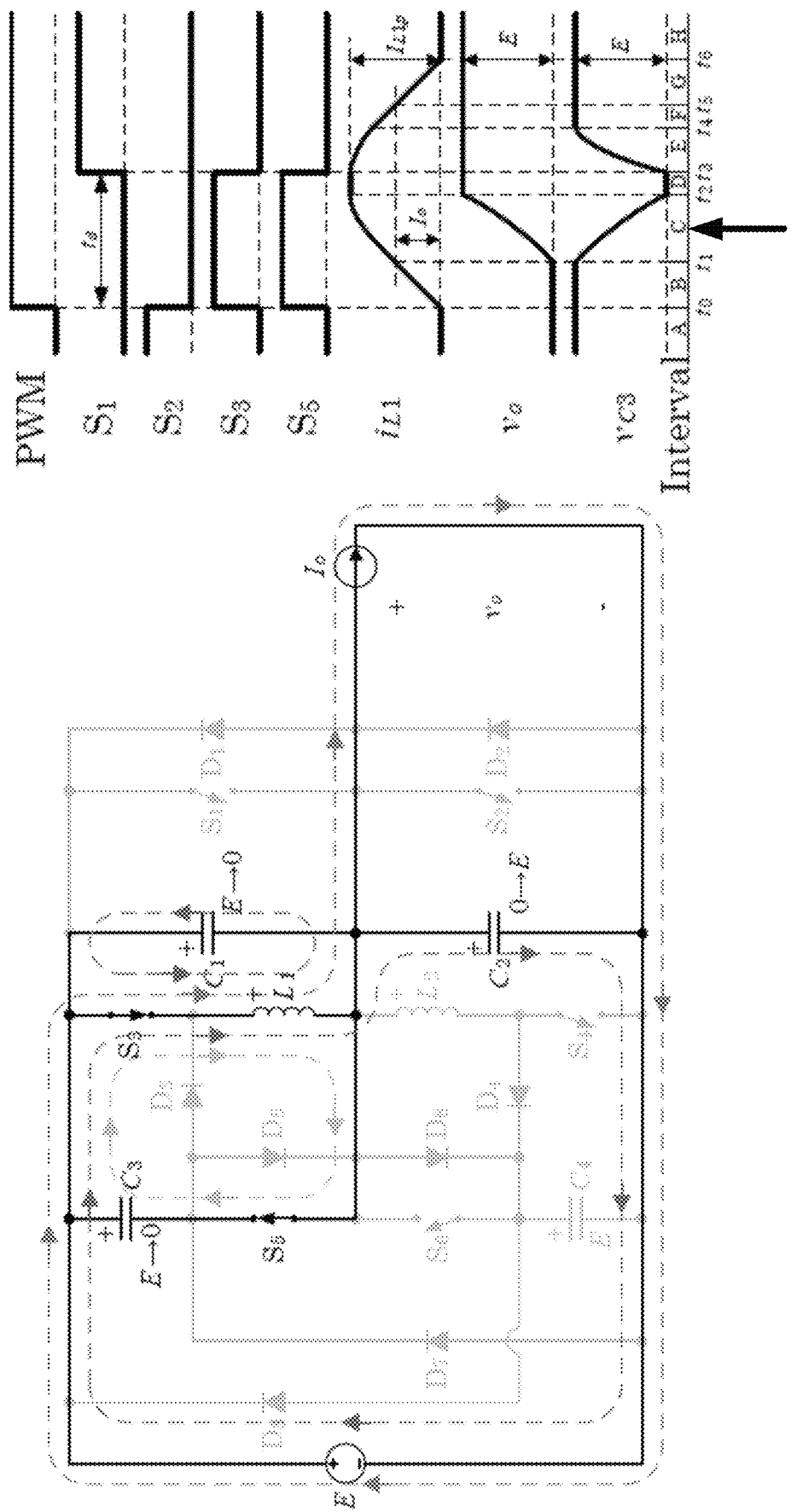
FIG. 2C is a schematic and timing diagram illustrating operation of a power inverter in a D2S commutation during time Interval C according to various aspects.

Interval C ($t_1 \le t<t_2$): At $t_{=1}$, $i_{L1}$ increases to $I_o$ whereupon $D_2$ stops conducting and $L_1$ starts to resonate with $C_1$, $C_2$, and $C_3$ (FIG. 2C). Voltage $v_o$ increases while $v_{C4}$ stays at E since $S_6$ is OFF.

Figure 2D:
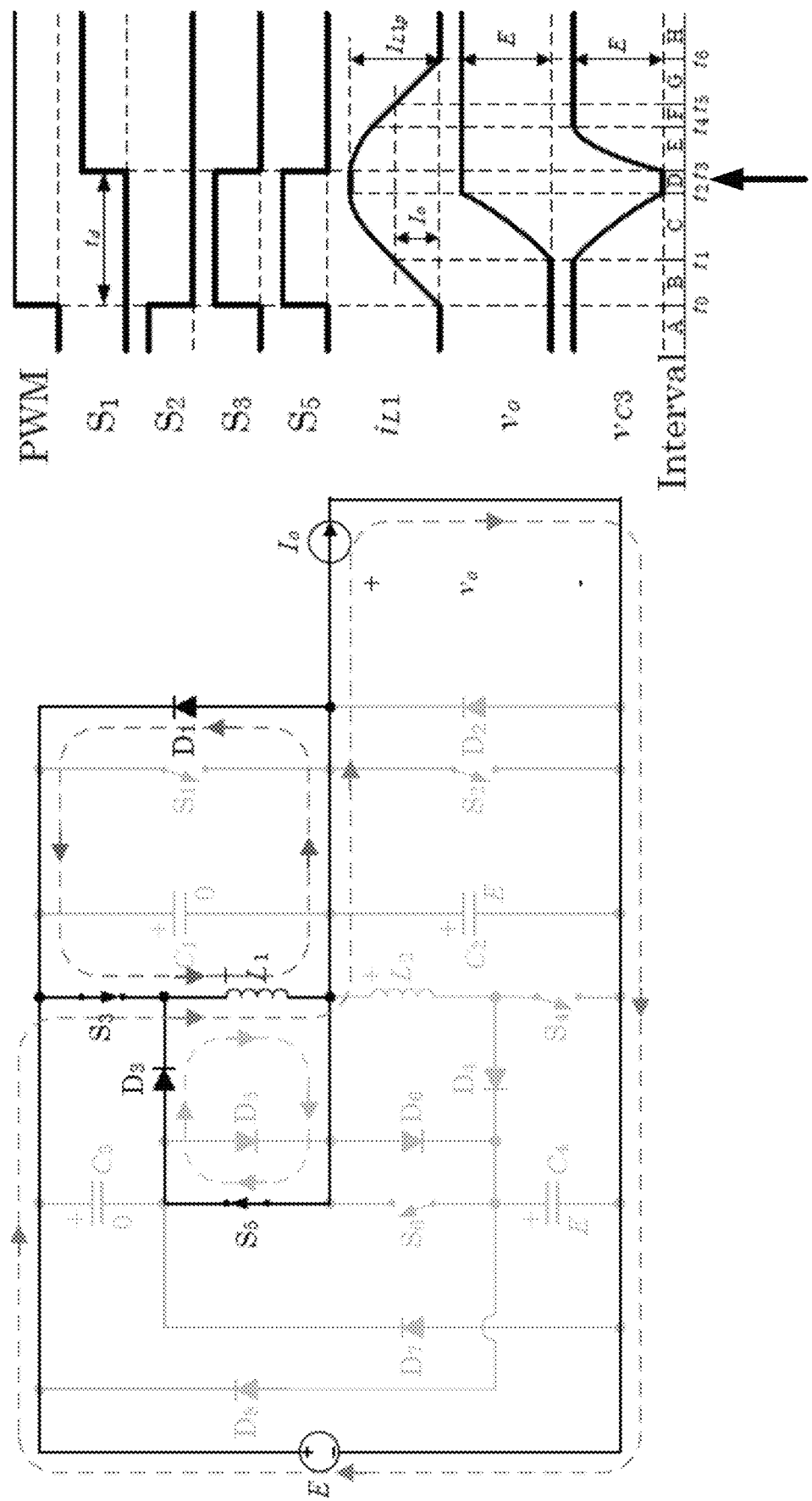
FIG. 2D is a schematic and timing diagram illustrating operation of a power inverter in a D2S commutation during time Interval D according to various aspects.

Interval D ($t_2 \leq t < t_3$): At $t_2$, $v_o$ reaches E and the resonance stops (FIG. 2D). Current $i_{L1}$ supplies $I_o$. Since $i_{L1} > I_o$, the extra current circulates in the circuit shown in FIG. 2D. Based on simulation and experiment, the extra current circulates in the $L_1$-$D_1$-$S_3$ and $L_1$-$S_5$-$D_3$ loops. The current in the $L_1$-$D_6$-$D_8$-$S_3$ loop is negligible because there are two diodes in this loop. Ideally, ii is constant and is actually at its peak value $$I_{L1p} = \frac{E}{Z_1} + I_o \tag{1}$$

where $$Z_1 = \sqrt{\frac{L}{2C_a + C_b}} \tag{2}$$

Figure 2E:
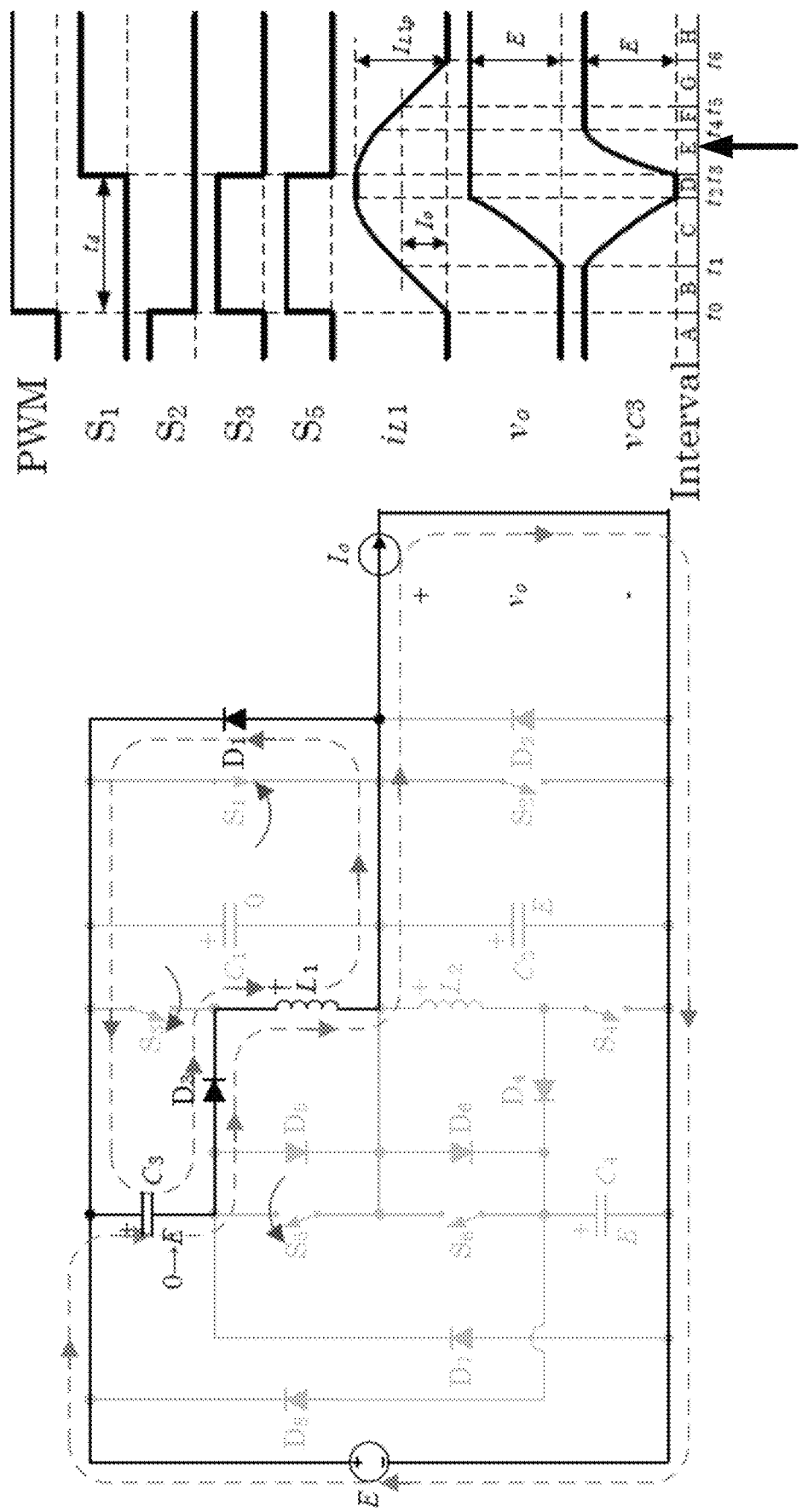
FIG. 2E is a schematic and timing diagram illustrating operation of a power inverter in a D2S commutation during time Interval E according to various aspects.

Interval E ($t_3 \leq t < t_4$): At $t_3$, $S_1$ is turned on while $S_3$ and $S_5$ are turned off so $i_{L1}$ starts to charge $C_3$ (FIG. 2E). Since $D_1$ is conducting, $S_1$ is turned on with ZVZCS. Since $v_{C3}(t_3)=0$, $S_3$ and $S_5$ are turned off with ZVS. The energy in $L_1$ at $t_3$ is $$W_{L1} = \frac{1}{2}L_1 I_{L1p}^2 > \frac{1}{2}C_b E^2 + \frac{1}{2}LI_o^2 \tag{3}$$

Therefore, $L_1$ has enough energy to charge $C_3$ to E.

Figure 2F:
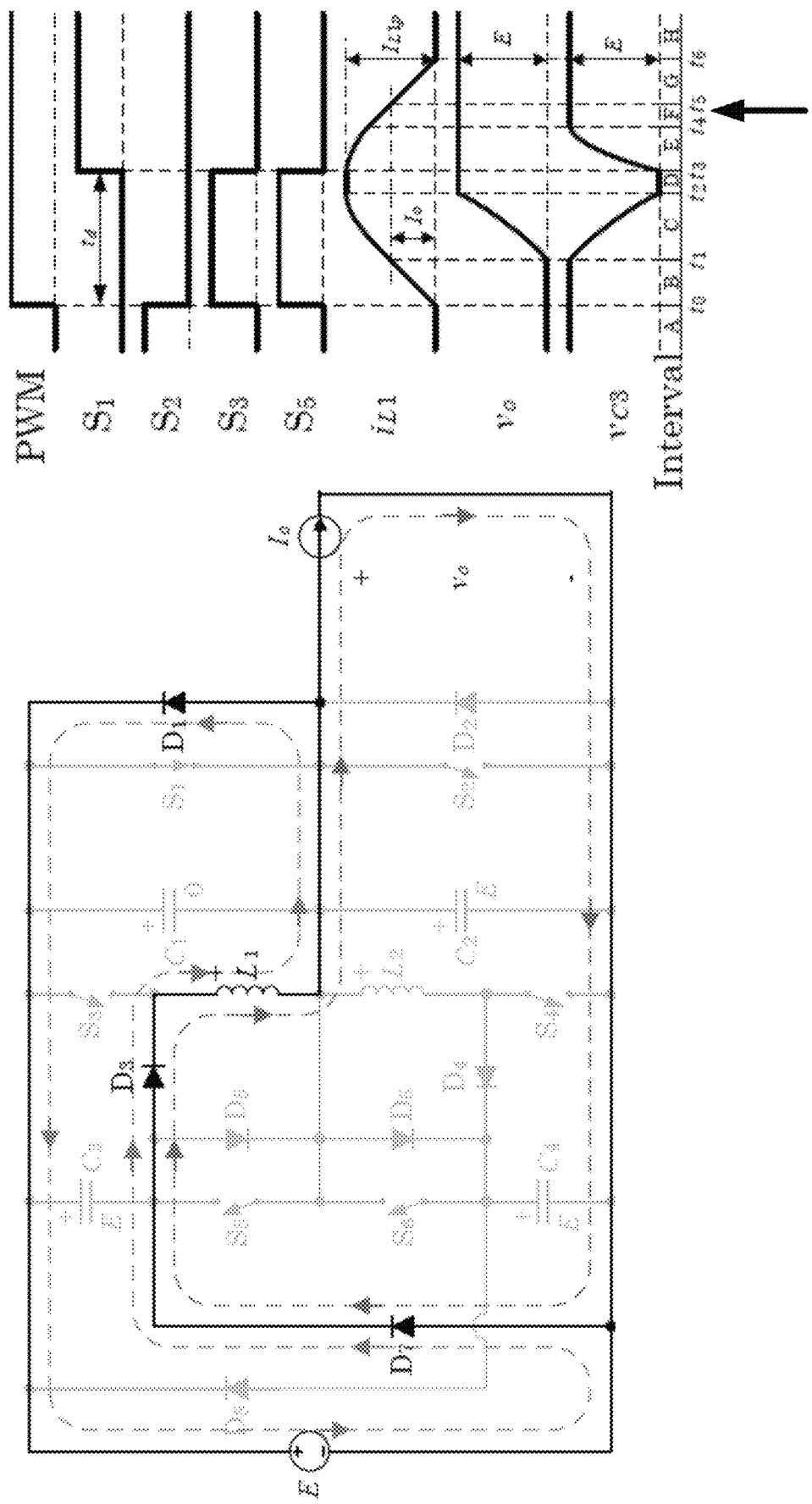
FIG. 2F is a schematic and timing diagram illustrating operation of a power inverter in a D2S commutation during time Interval F according to various aspects.

Interval F ($t_4 \leq t < t_5$): At $t_4$, $C_3$ is charged to E whereupon $D_7$ starts to conduct (FIG. 2F). The energy transferred to $C_3$ is $\frac{1}{2}C_b E^2$, so the energy remains in $L_1$ is still higher than $\frac{1}{2}LI_o^2$ according to (3). Therefore, $i_{L1}(t_4) > I_o$, so $D_1$ still conducts current. Current $i_{L1}$ will decrease linearly, and the energy will flow back to the DC source.

Figure 2G:
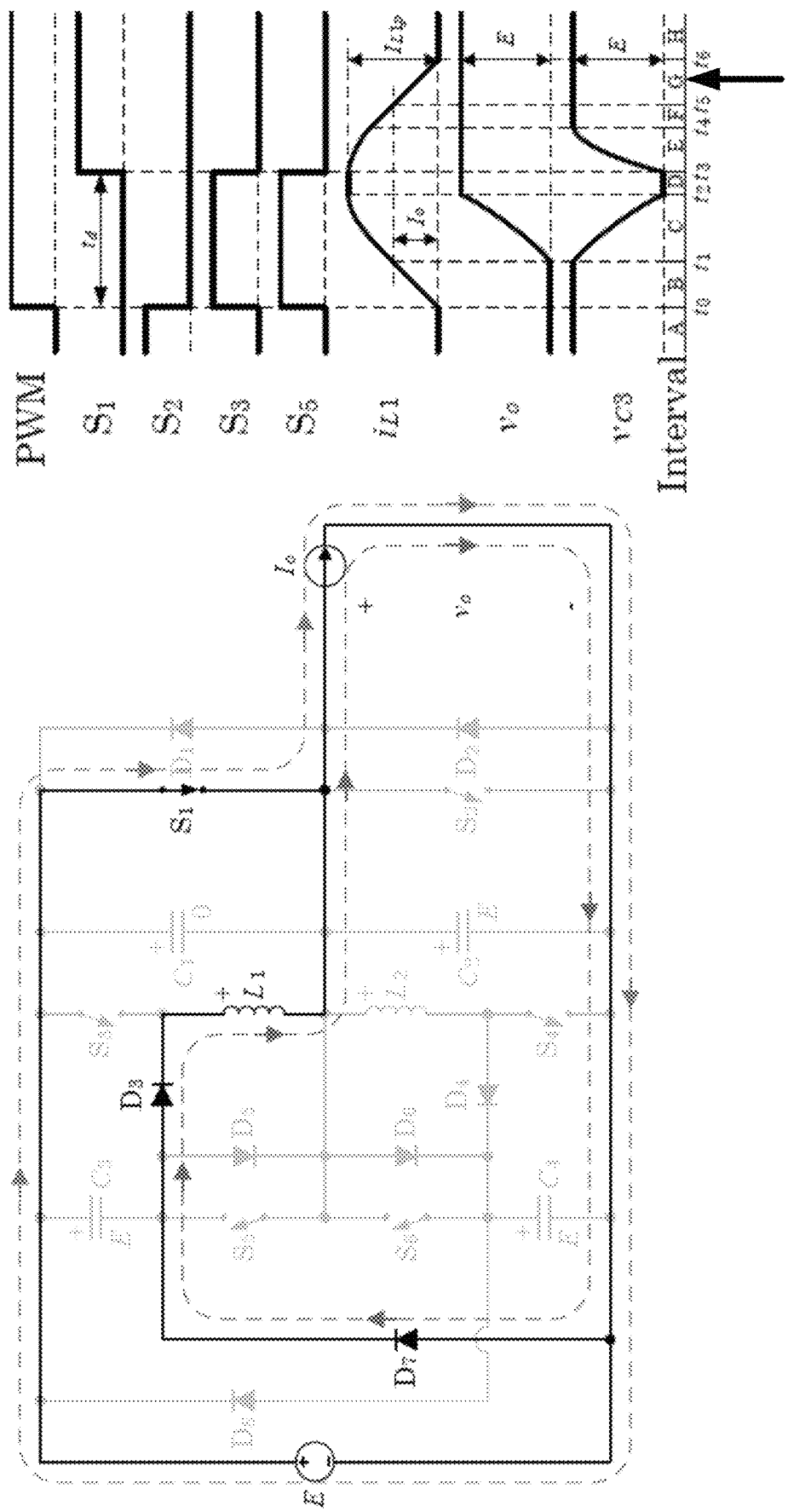
FIG. 2G is a schematic and timing diagram illustrating operation of a power inverter in a D2S commutation during time Interval G according to various aspects.
Figure 2H:
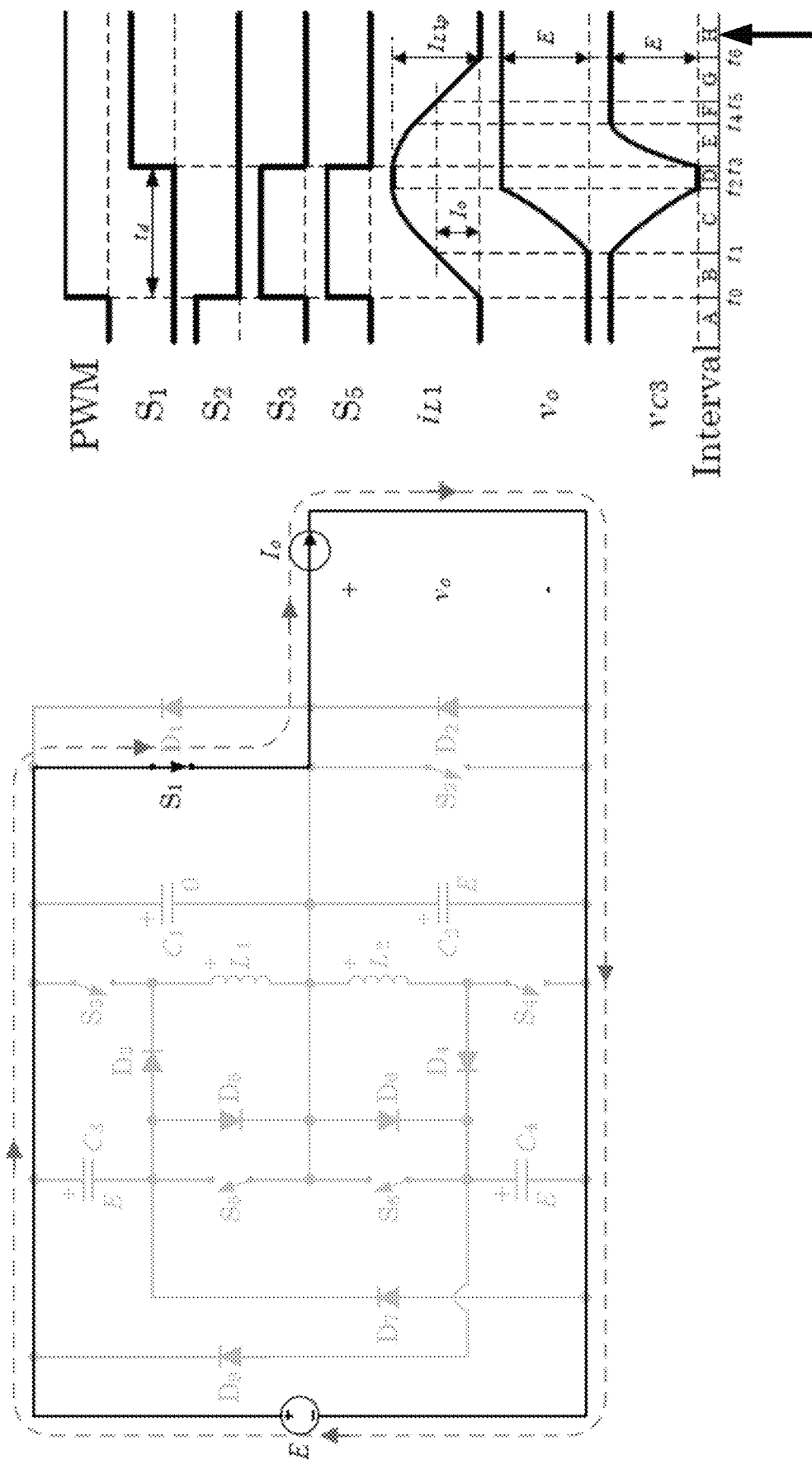
FIG. 2H is a schematic and timing diagram illustrating operation of a power inverter in a D2S commutation during time Interval H according to various aspects.

Interval G ($t_5 \leq t < t_6$): At $t_5$, $i_{L1}$ decreases to $I_o$ while $D_1$ stops conducting and $S_1$ starts to conduct (FIG. 2G). Current $i_{L1}$ decreases linearly to zero at $t_6$, which ends the D2S commutation.

B. Switch-to-Diode Commutation

A commutation in which the output current commutes from a switch to a diode is called a switch-to-diode (S2D) commutation.

Figure 3A:
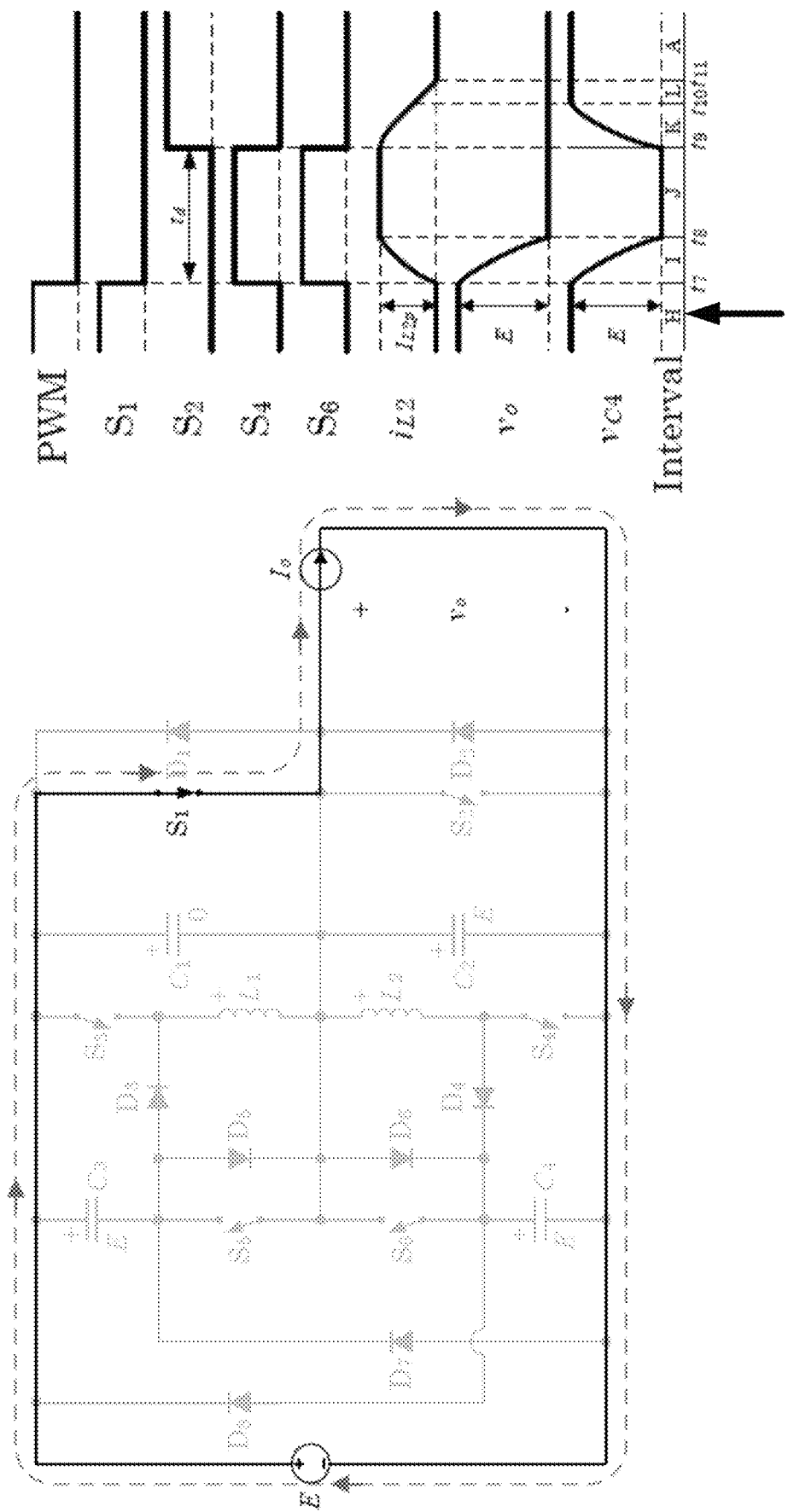
FIG. 3A is a schematic and timing diagram illustrating operation of a power inverter in a switch-to-diode (S2D) commutation during time Interval H according to various aspects.

Interval H ($t_6 \leq t < t_7$): Prior to an S2D commutation, the circuit is in Interval H where $S_1$ is conducting (FIG. 3A).

Figure 3B:
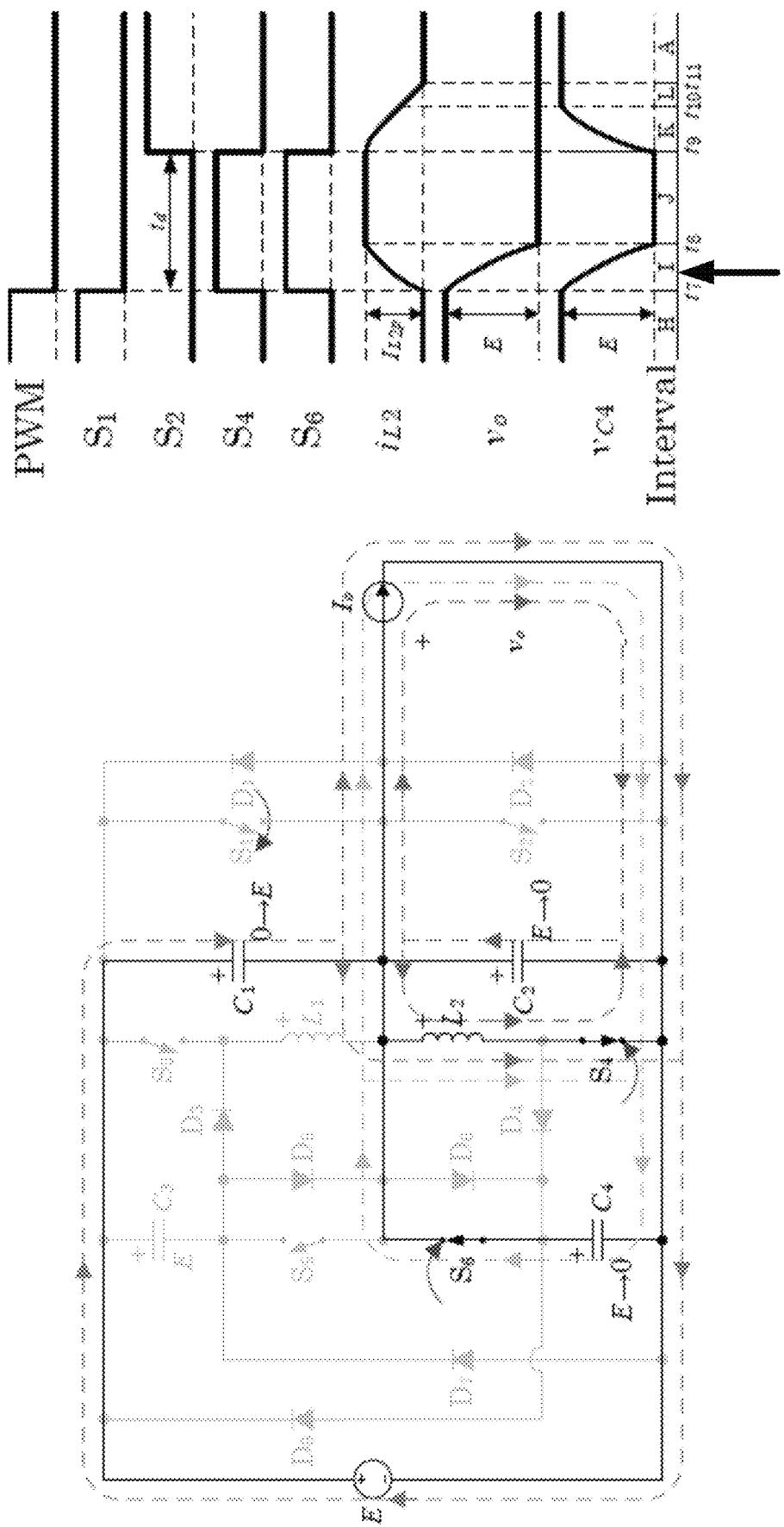
FIG. 3B is a schematic and timing diagram illustrating operation of a power inverter in an S2D commutation during time Interval I according to various aspects.

Interval I ($t_7 \leq t < t_8$): At $t_7$, an S2D commutation is commanded so $S_1$ is turned off while $S_4$ and $S_6$ are turned on. Inductor $L_2$ starts to resonate with $C_1$, $C_2$, and $C_4$ (FIG. 3B). Since $v_{C1}(t_7)=0$, $S_1$ is turned off with ZVS. Since $i_{L2}(t_7)=0$, $S_4$ is turned on with ZCS. Since $v_{C4}(t_7)=E$, $S_6$ is turned on with ZVZCS. Voltage $v_o$ decreases and $v_{C3}$ stays at E since $S_5$ is OFF.

Figure 3C:
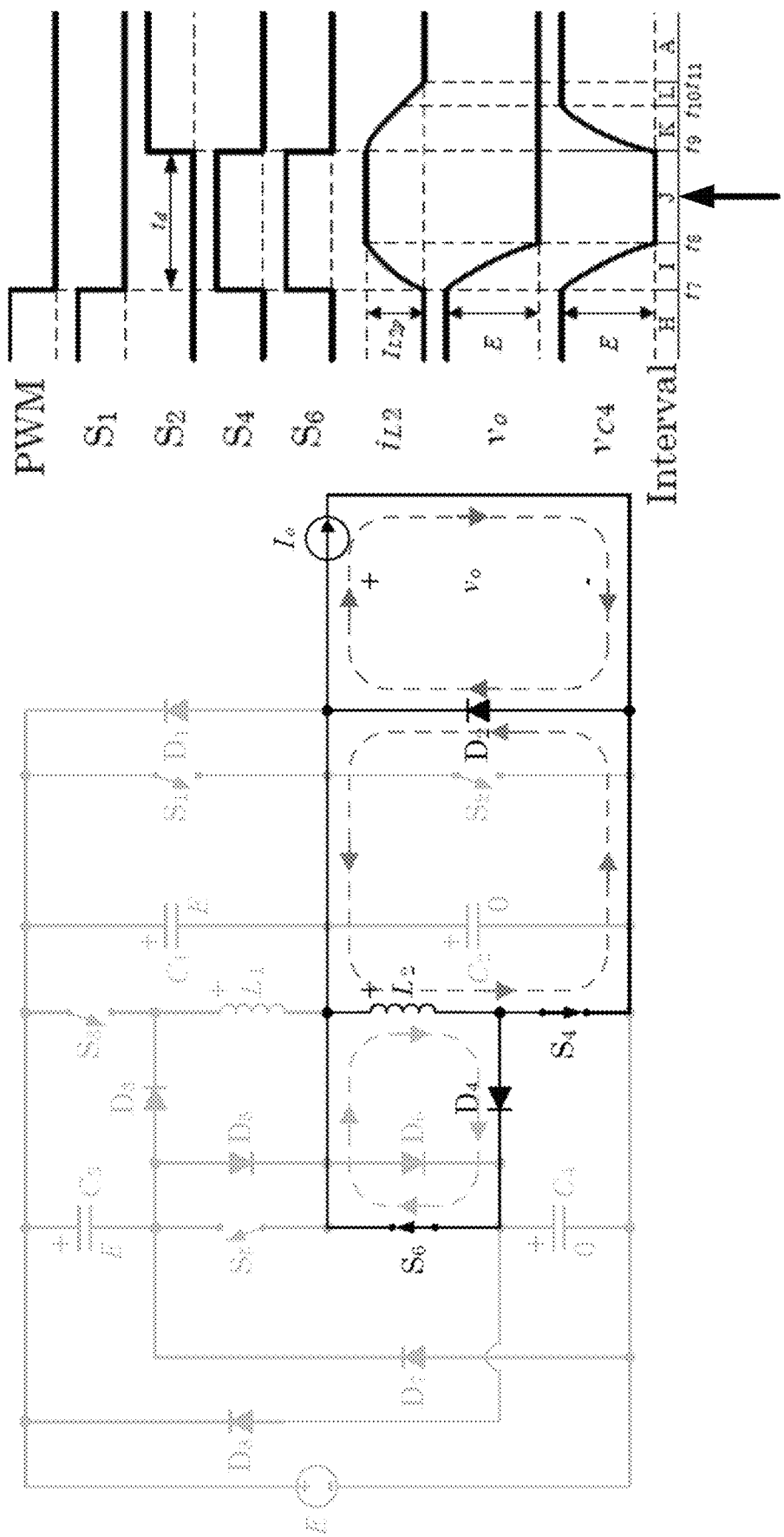
FIG. 3C is a schematic and timing diagram illustrating operation of a power inverter in an S2D commutation during time Interval J according to various aspects.

Interval J ($t_8 \leq t < t_9$): At $t_8$, $v_o$ decreases to zero and $i_{L2}$ starts to circulate in the circuit (FIG. 3C). According to the simulation and experiment, $i_{L2}$ circulates in the $L_2$-$S_4$-$D_2$ and $L_2$-$D_4$-$S_6$ loops. The current in the $L_2$-$S_4$-$D_7$-$D_5$ loop is negligible. Ideally, $i_{L2}$ is constant and is at its peak value $$I_{L2p} = \sqrt{I_o^2 + \left(\frac{E}{Z_1}\right)^2} - I_o \tag{4}$$

Figure 3D:
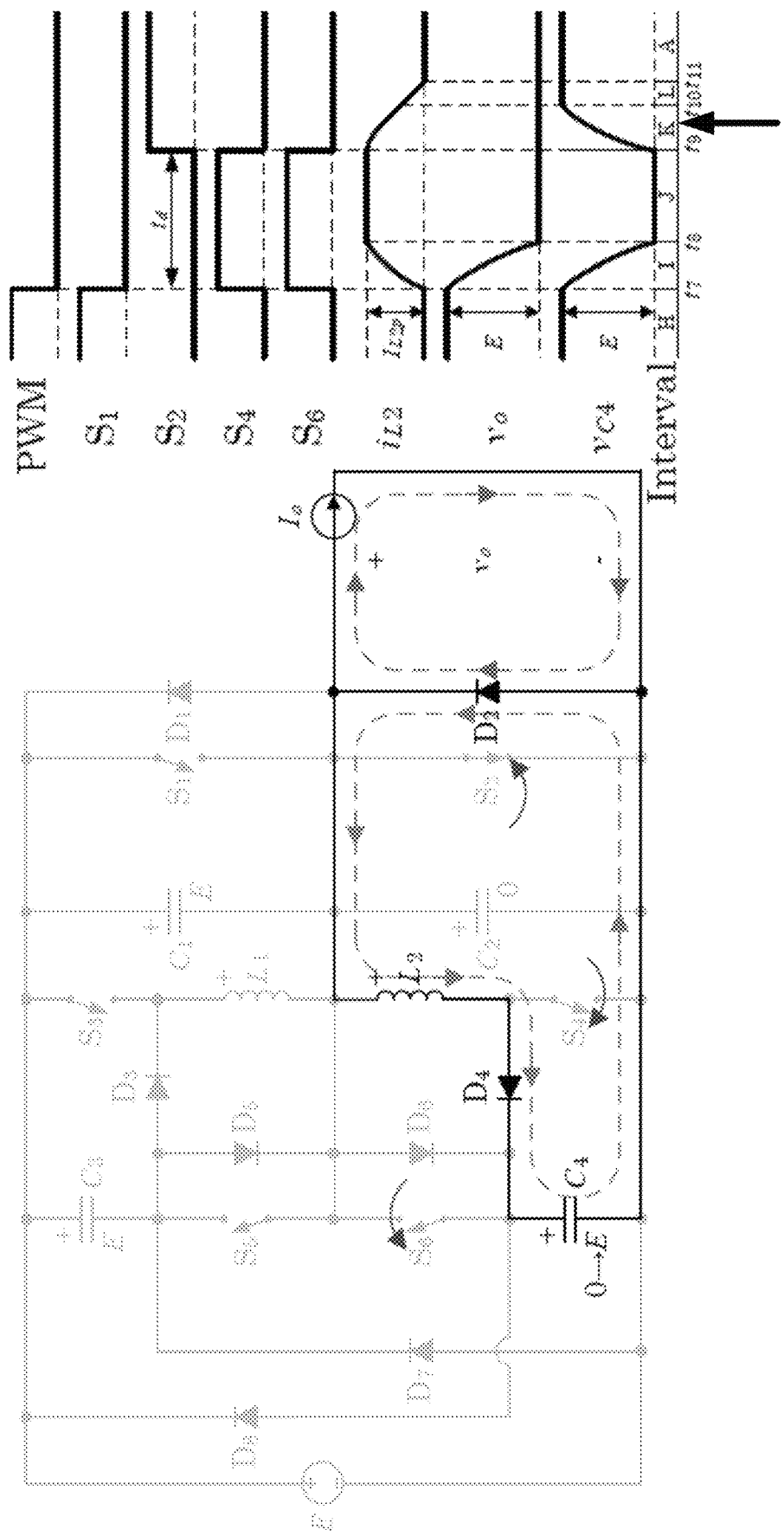
FIG. 3D is a schematic and timing diagram illustrating operation of a power inverter in an S2D commutation during time Interval K according to various aspects.
Figure 3E:
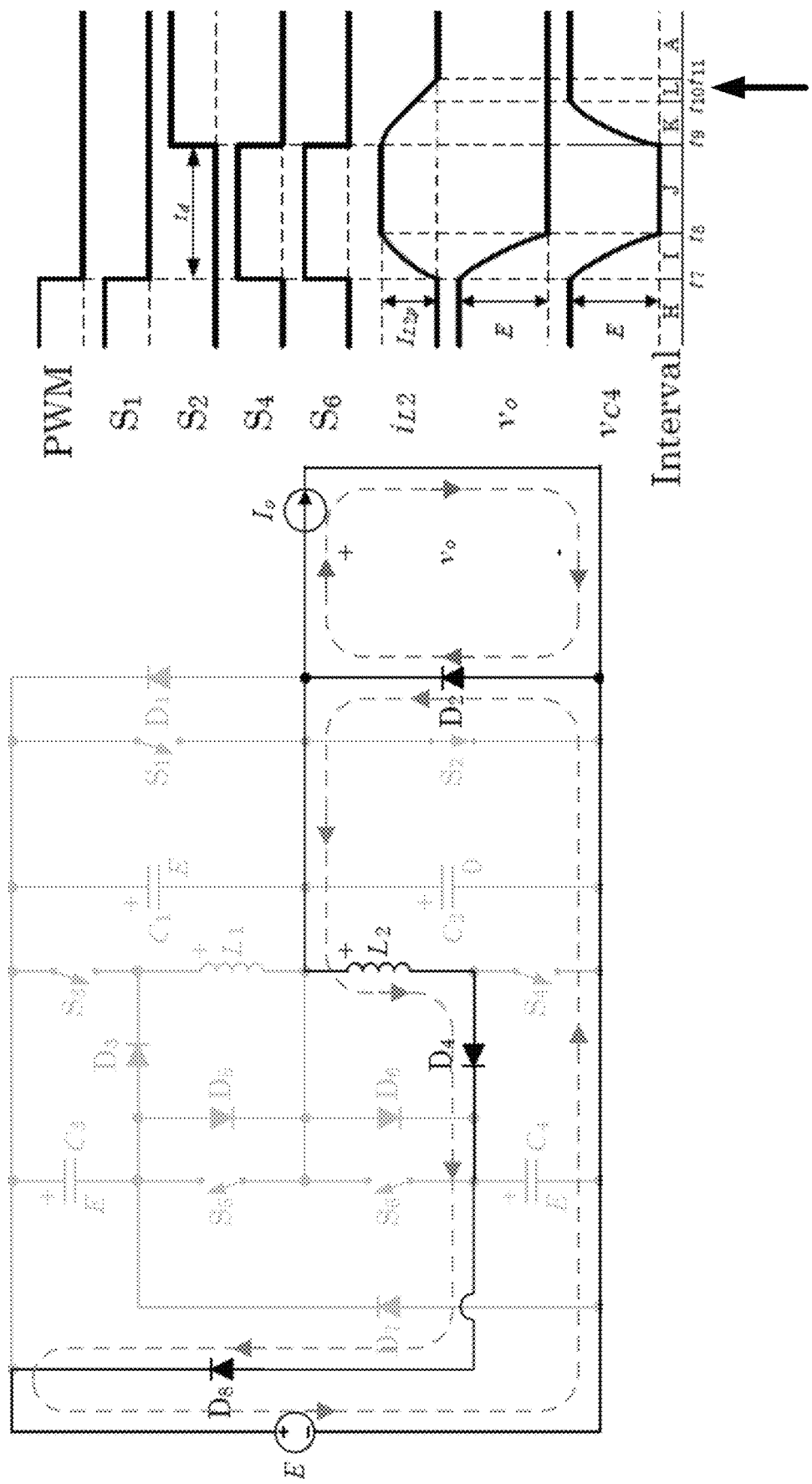
FIG. 3E is a schematic and timing diagram illustrating operation of a power inverter in an S2D commutation during time Interval L according to various aspects.

Interval K ($t_9 \leq t < t_{10}$): At $t_9$, $S_2$ is turned on while $S_4$ and $S_6$ are turned off. Current $i_{L2}$ starts to charge $C_4$ (FIG. 3D). Since $D_2$ is conducting, $S_2$ is turned on with ZVZCS. Since $v_{C4}(t_9)=0$, $S_4$ and $S_6$ are turned off with ZVS. Unlike the D2S commutation, $L_2$ may not have sufficient energy to charge $C_4$ up to E. Here, it is assumed that $L_2$ has sufficient energy so $v_{C4}$ reaches E.

Interval L ($t_{10} \leq t < t_{11}$): At $t_{10}$, $v_{C4}$ reaches E and $D_8$ starts to conduct. Current $i_{L2}$ decreases linearly to zero at $t_{11}$, which completes an S2D commutation.

C. Alternative Mode of Operation

According to (4), $I_{L2p}$ decreases when $I_o$ increases. The energy in $L_2$ in Interval J is $$W_{L2} = \frac{1}{2}LI_{L2p}^2 \tag{5}$$

It may be less than $\frac{1}{2}C_b E^2$, especially when $I_o$ is large or $C_a$ is much smaller than $C_b$. Therefore, $C_4$ may not be charged to E even absorbing all energy in $L_2$. In this case, Interval K ends at $t'_{10}$ when $i_{L2}$ decreases to zero. The circuit operation will then skip Interval L and goes directly to Interval A. Then, the initial voltage of $C_4$ for the next D2S commutation $v_{C4,0}$ is less than E. In the next D2S commutation, $C_4$ stays at $v_{C4,0}$ in Interval B. Interval C will actually have two subintervals denoted by Intervals $C_1$ and $C_2$.

Interval $C_1$ ($t_1 \leq t < t_{1.5}$): This interval is similar to Interval C (FIG. 2C) except that $v_{C4}$ stays at $v_{C4,0}$.

Figure 4:
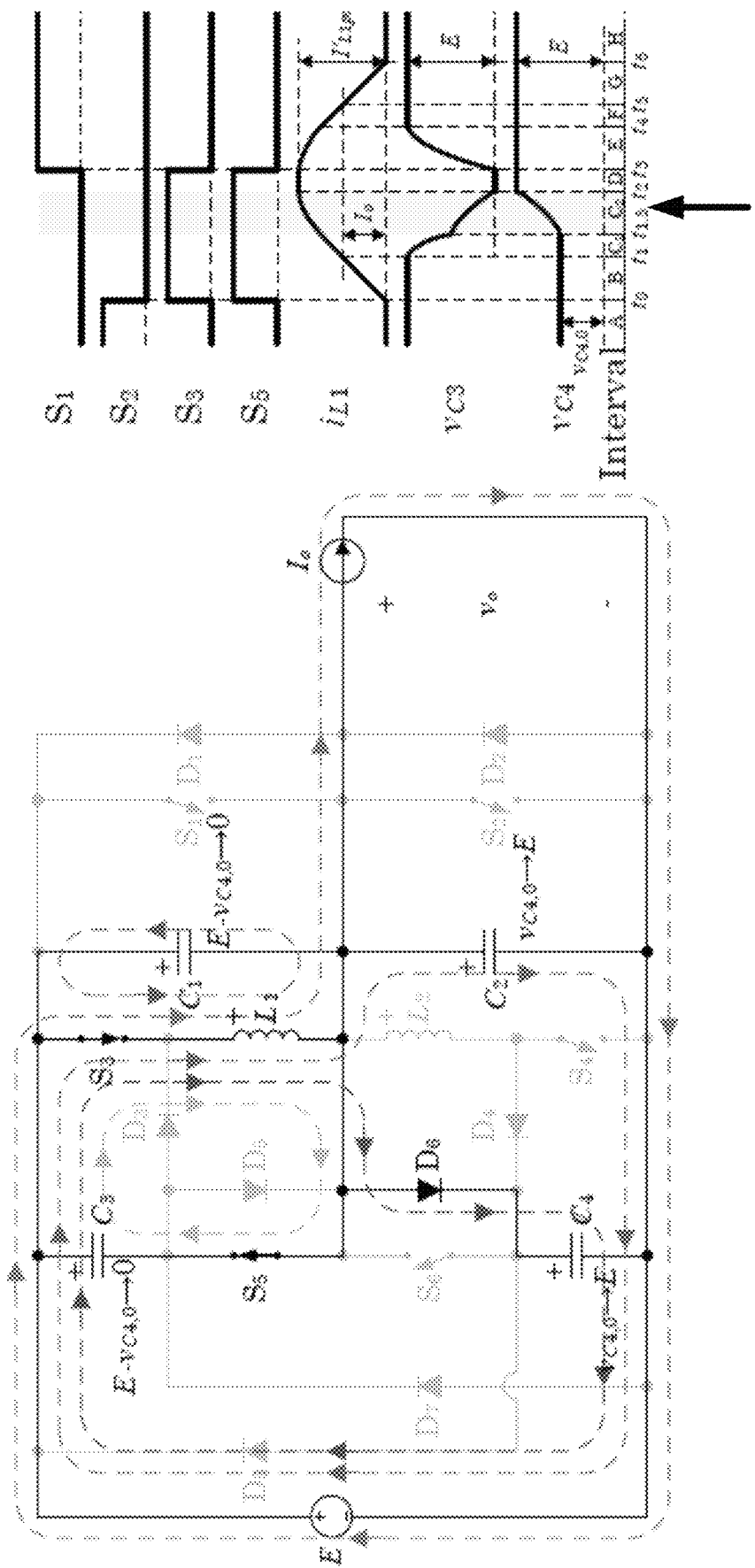
FIG. 4 is a schematic and timing diagram illustrating operation of a power inverter circuit in a D2S commutation during time Interval $C_2$ according to various aspects.

Interval $C_2$ ($t_{1.5} \leq t < t_2$): At $t_{1.5}$, $v_o$ increases to $v_{C4,0}$ and $D_6$ starts to conduct current (FIG. 4). Inductor $L_1$ starts to resonate with $C_{1-4}$. When v, increases to E, $i_{L1}$ increases to its peak value $$I'_{L1p} = \sqrt{\left(\frac{E - v_{C4,0}}{Z_3}\right)^2 \left(1 - \frac{Z_3^2}{Z_1^2}\right) + \left(\frac{E}{Z_1}\right)^2} + I_o \tag{6}$$

where $$Z_3 = \sqrt{\frac{L}{2C_a + 2C_b}} \tag{7}$$

Since $Z_3 < Z_1$ and $I'_{L1p} > I_{L1P}$, according to (3), $L_1$ has enough energy to charge $C_3$ up to E, and the remaining $i_{L1}$ is still greater than $I_o$. This interval ends at $t_2$ when $v_o$ increases to E. Voltage $v_{C4}$ increases to E at $t_2$, which prepares for the next S2D commutation. This pre-charging feature is not available in AAERP or DARCP, so they may result in high dv/dt.

D. Summary of Circuit Operation

The gating signals of the ARSEP inverter can be generated based on the PWM signal and a time delay td, as shown in FIG. 3. The requirement on td is $$t_d > t_B + t_C = \frac{I_o L}{E} + t_C \tag{8}$$

where $$\frac{\pi}{2\omega_1} \leq t_C < \frac{\pi}{2\omega_3} \tag{9}$$

$$\omega_1 = \frac{1}{\sqrt{L(2C_a + C_b)}} \tag{10}$$

$$\omega_3 = \frac{1}{\sqrt{L(2C_a + 2C_b)}} \tag{11}$$

From (8), td is a function of $f_o$. The first term depends on circuit parameters, and the second term is mainly determined by allowable dv/dt. Therefore, it is possible to reduce $t_d$ through the parameter design to cater to high switching frequencies.

If $t_d$ is constant, all gating signals can be generated without any sensing. Then, $t_d$ should be longer than the maximum possible voltage commutation time $$t_{c,max} = (t_B + t_C)_{max} = \frac{I_p L}{E} + \frac{\pi}{2\omega_3} \tag{12}$$

where $I_p$ is the peak output current. If $I_o$ is measured by a current sensor, a lookup table can be used to determine the required $t_d$. Then, the duration of Intervals D and J as well as the associated losses can be reduced without affecting the dv/dt performance.

Figure 5A:
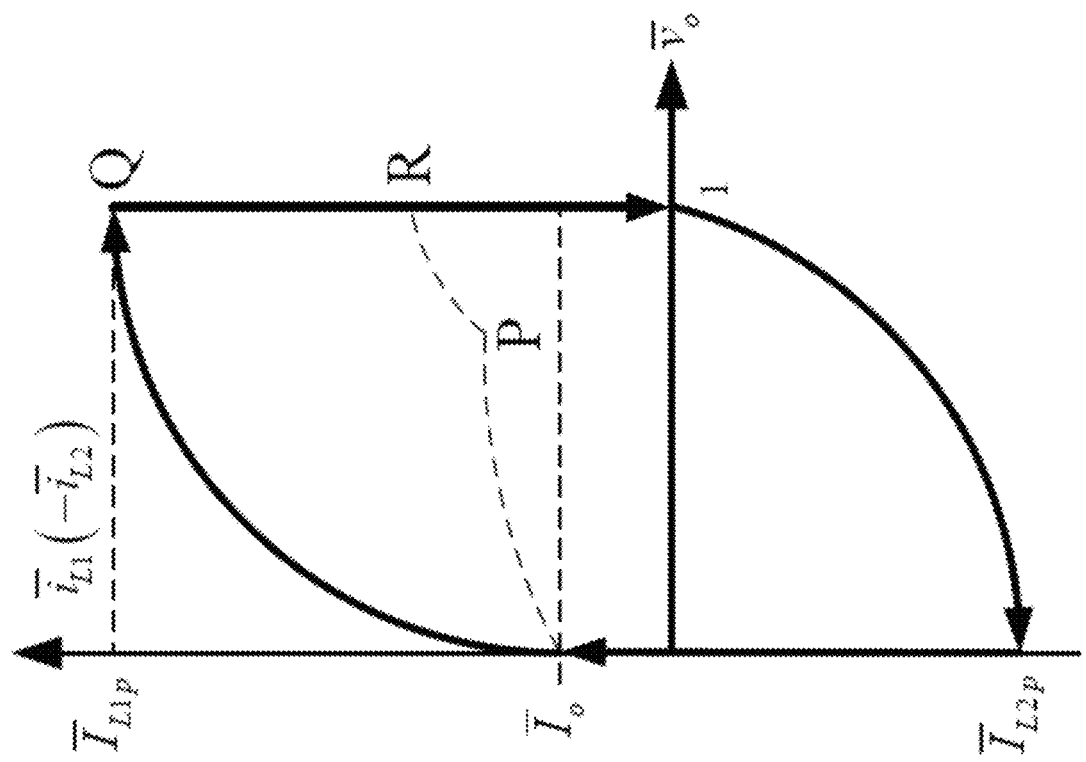
FIG. 5A-B are state-plane plots of ARSEP and AAERP according to various aspects.

The circuit operation can be represented in a more concise way using a state-plane plot as shown in FIG. 5A. The two normalized states for the state-plane plot are defined as:

$$\bar{i} = \frac{iZ_1}{E}, \bar{v} = \frac{v}{E} \tag{13}$$

The moving directions of the state are indicated by arrows. From $t_1$ to $t_{1.5}$, the state follows a circular arc about the center $(1, \bar{I}_o)$ with a rotational speed of $\omega_1$. Similarly, from $t_7$ to $t_8$, the state follows another circular arc about the center $(0, \bar{I}_0)$ with the same speed $\omega_1$. If $v_{C4,0}=E$, from Point P, the state will keep following the solid circular arc to Point Q. If $v_{C4,0}<E$, from Point P, the state follows the dashed curve and goes to Point R.

Figure 5B:
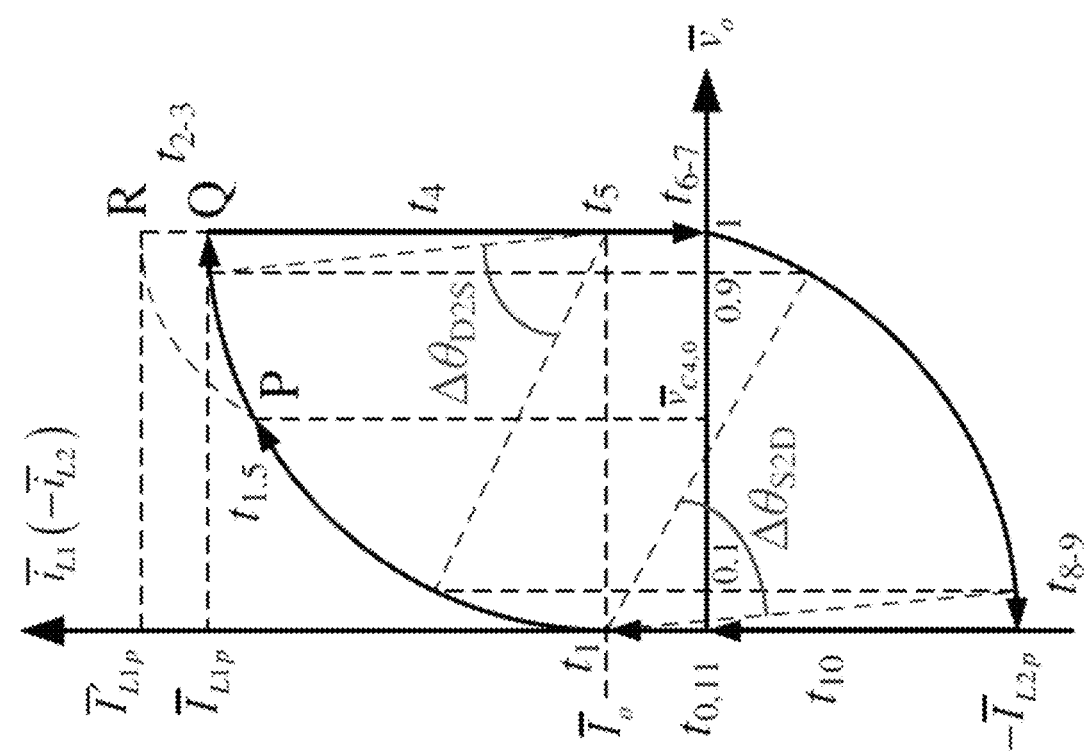

The state-plane plot of AAERP is shown in FIG. 5B. When $C_3$ and $C_4$ are fully charged, the state follows the solid line to Point Q. However, when $C_3$ or $C_4$ is lightly charged (which is likely when $I_o$ is large), the state moves from the origin to Point P and then to Point R, during which high dv/dt will occur. DARCP suffers a similar problem. ARSEP solves the problem by pre-charging $C_3$ ($C_4$) through diode $D_5$ ($D_6$) so that dv/dt can be well controlled by circuit parameters.

E. Voltage and Current Characteristics

The peak inductor current, di/dt, and dv/dt in the ARSEP inverter can be derived as:

$$I_{L,max} = \frac{E}{Z_3} + I_p = \left(\frac{1}{Z_3} + 1\right)I_p \tag{14}$$

$$\frac{di_L}{dt_{max}} = \frac{E}{L} \tag{15}$$

$$\frac{dv_o}{dt_{max}} = \frac{0.8E\omega_1}{\Delta\theta_{T2D}(\bar{Z}_1)} \tag{16}$$

where $$\Delta\theta_{S2D}(\bar{Z}_1) = \cos^{-1}\frac{0.1}{\sqrt{\bar{Z}_1^2 + 1}} - \cos^{-1}\frac{0.9}{\sqrt{\bar{Z}_1^2 + 1}} \tag{17}$$

is the angle being swept when $\bar{v}_o$ decreases from 0.9 to 0.1, as shown in FIG. 5A, because dv/dt defined by the NEMA MG-1 standard is the average voltage-change rate when the voltage changes between 10% and 90%. The normalized impedance is defined as $$\bar{Z} = \frac{I_p Z}{E} \tag{18}$$

F. Example

Table 1—ARSEP Inverter Design Specification (Example)

| Item | Value |
| --- | --- |
| DC-bus voltage, E | 200 V |
| Peak output current, $I_p$ | 20 A |
| Maximum voltage edge rate, dv/dt$_{limit}$ | 200 V/μs |
| Maximum current edge rate, di/dt$_{limit}$ | 50 A/μs |
| Maximum inductor current, $I_{L,limit}$ | 50 A |
| Switching frequency, $f_{sw}$ | 10 kHz |
| Maximum commutation time | 5 μs |

By way of example, given the specifications in Table 1, an ARSEP inverter may be designed as follows. Referring to (14)

$$\bar{Z}_3 > \frac{I_p}{I_{L,limit} - I_p} = 0.67 \tag{19}$$

It is selected that $\bar{Z}_3=1$ to limit the maximum inductor current. Based on (2) and (7), it can be concluded that $Z_1 > Z_3$, so it is selected that $Z_1 = 1.1$. Subsequently, according to (16) and (17)

$$\Delta\theta_{S2D} = 0.583 \text{ rad} \quad (20)$$

$$\omega_1 = \frac{\frac{dv}{dt_{limit}}\Delta\theta_{S2D}}{0.8E} = 0.729 \text{ rad}/\mu s \quad (21)$$

Based on $Z_1$, $Z_3$, and $\omega_1$, the values of the resonant components are calculated to be $L=15$ μH, $C_a=50$ nF, and $C_b=25$ nF. In order to maximize the benefit of soft switching, $C_b$ should be large enough so that $S_3$ and $S_4$ are over-snubbed. With this design, according to (12) and (14)-(16), $t_{cmax}=3.9$ μs, $I_{Lmax}=40$ A, $di_L/dt_{max}=13.3$ A/μs, and $dv_o/dt_{max}=200$ V/μs, which satisfy NEMA standards.

Figure 6:
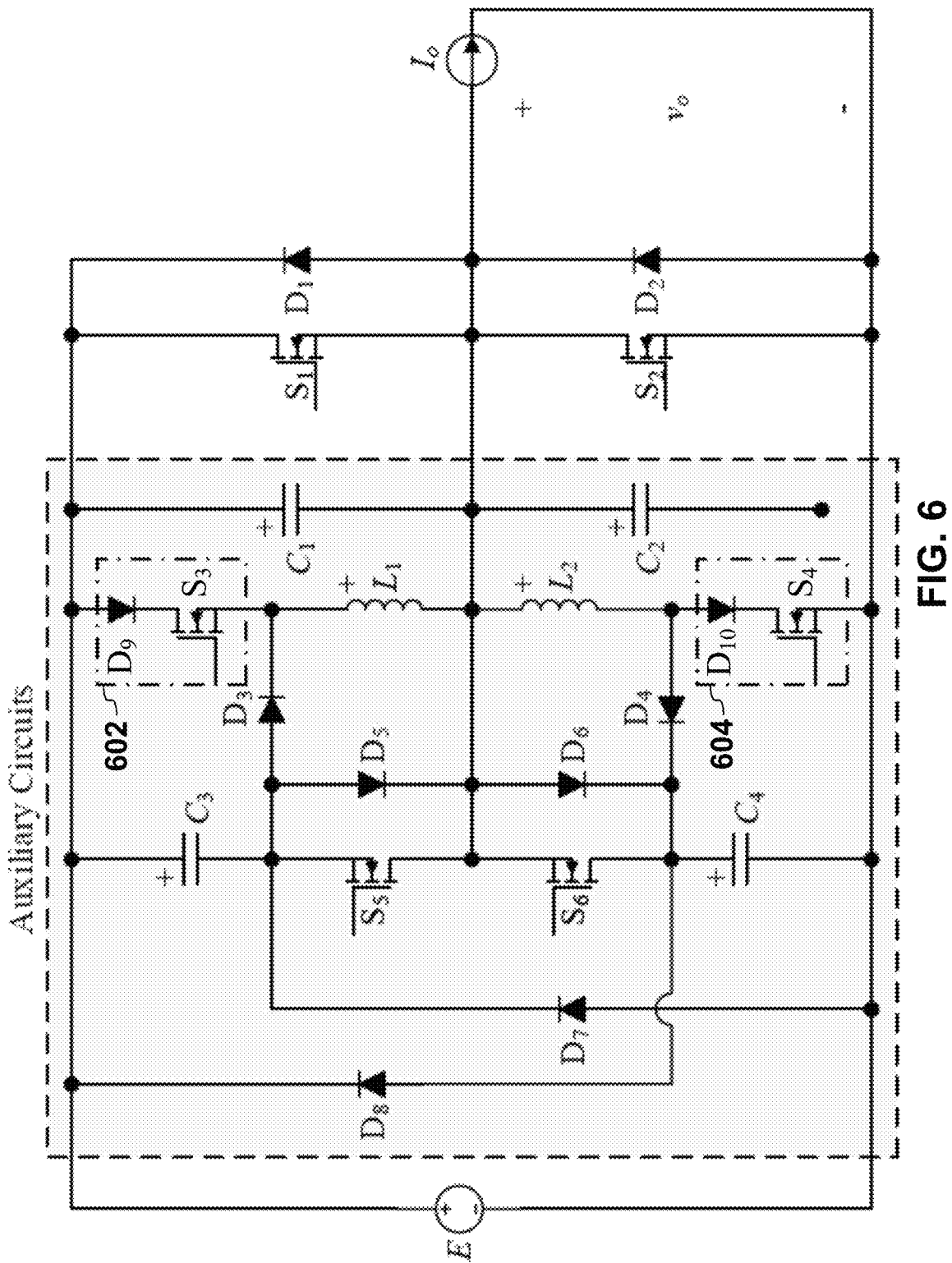
FIG. 6 is a schematic illustrating an auxiliary resonant soft-edge pole inverter circuit with metal-oxide-semiconductor field-effect transistors (MOSFETs) according to various aspects.

FIG. 6 illustrates an example of the circuit. The switches may be include metal-oxide-semiconductor field-effect transistors (MOSFETs) (as shown in FIG. 6), an insulated-gate bipolar junction transistor (IGBT), or other suitable transistor. When the switches labelled $S_3$ and $S_4$ are MOSFET devices, there are diodes in series with the MOSFET "switch" (labeled $D_9$ and $D_{10}$ in FIG. 6), since the unidirectional switches $S_3$ and $S_4$ should conduct current in one direction only.

The presently disclosed ARSEP circuit may be implemented to control power inverters in hybrid and electric vehicles, aircraft actuators, ship propulsion, and grid integration of renewable energy sources, or other applications.

In various aspects and examples, the auxiliary resonant soft-edge pole inverter circuit may include a first pair of capacitors ($C_1$ and $C_2$) in parallel with a corresponding pair of main power switching modules, each power switching module comprising a switch ($S_1$/$S_2$) and a diode ($D_1$/$D_2$) in parallel and sharing a common central node with the first pair of capacitors.

The auxiliary resonant soft-edge pole inverter circuit may further include a first pair of auxiliary switches ($S_3$ and $S_4$) connected in series with a first pair of inductors ($L_1$ and $L_2$) to generate resonant current from a DC power source (E), the first pair of inductors also sharing the common central node.

The auxiliary resonant soft-edge pole inverter circuit may further include a second pair of auxiliary switches ($S_5$ and $S_6$) connected in series with a second pair of capacitors ($C_3$ and $C_4$). The second pair of auxiliary switches ($S_5$ and $S_6$) also sharing the common central node, the circuit producing an alternating current output at the common central node.

The auxiliary resonant soft-edge pole inverter circuit may further include a second pair of diodes ($D_3$ and $D_4$) connected between the second pair of auxiliary switches ($S_5$ and $S_6$) and the inductors ($L_1$ and $L_2$).

The auxiliary resonant soft-edge pole inverter circuit may further include a third pair of diodes ($D_5$ and $D_6$) connected in parallel with the second set of auxiliary switches ($S_5$ and $S_6$) and sharing the common central node.

The auxiliary resonant soft-edge pole inverter circuit may further include a fourth pair of diodes ($D_7$ and $D_9$) connected between the second pair of auxiliary switches ($S_3$ and $S_4$) and the DC power source (E).

The auxiliary resonant soft-edge pole inverter circuit may further include a fifth pair of diodes ($D_9$ and $D_{10}$) respectively connected in series with the second pair of auxiliary switches ($S_3$ and $S_4$).

In various aspects and examples, the power inverter may include a plurality of capacitors comprising a first capacitor $C_1$, a second capacitor $C_2$, a third capacitor $C_3$, and a fourth capacitor $C_4$. The power inverter may further include a plurality of switches. The switches may include a first switch $S_1$, a second switch $S_2$, a third switch $S_3$, a fourth switch $S_4$, a fifth switch $S_5$, and a sixth switch $S_6$. The power inverter may include a plurality of inductors. The inductors may include a first inductor $L_1$ and a second inductor $L_2$. The power inverter may further include a plurality of diodes comprising a first diode $D_1$ and a second diode $D_2$.

The first switch $S_1$ may be connected in parallel with the first capacitor $C_1$ and the first diode $D_1$. The second switch $S_2$ may be connected in parallel with a second capacitor $C_2$ and a second diode $D_2$.

The third switch $S_3$ may be connected in series with the first inductor $L_1$. The fourth switch $S_4$ may be connected in series with the second inductor $L_2$.

The fifth switch $S_5$ may be connected in series with the third capacitor $C_3$ and the sixth switch $S_6$ may be connected in series with the fourth capacitor $C_4$.

The first switch $S_1$, the second switch $S_2$, the first diode $D_1$, the second diode $D_2$, the first capacitor $C_1$, the second capacitor $C_2$, the first inductor $L_1$, the second inductor $L_2$, and the fifth switch $S_5$ and the sixth switch $S_6$ may share a common node.

In some examples, the diodes further comprise third diode $D_3$ and fourth diode $D_4$. The third diode $D_3$ may be connected between the third switch $S_3$ and the first inductor $L_1$. The fourth diode $D_4$ may be connected between the second inductor $L_2$ and the fourth switch $S_4$.

In some examples, the diodes may further include a fifth diode $D_5$ and sixth diode $D_6$. The fifth diode $D_5$ may be connected in parallel with the fifth switch $S_5$ and the sixth diode $D_6$ may be connected in parallel with the sixth switch $S_6$. Further, the fifth diode $D_5$ and the sixth diode $D_6$ may both connect to the common node.

In some examples, the diodes may include a seventh diode $D_7$ and an eight diode $D_8$. The seventh diode $D_7$ may be connected between the fourth switch $S_4$ and a DC power source E. The eight diode $D_8$ may be connected between the third switch $S_3$ and the DC power source E.

In some examples, the third switch $S_3$ and the fourth switch $S_4$ may include MOSFETs. In such examples, the diodes may further include a diode $D_9$ and a diode $D_{10}$. The diode $D_9$ may be connected in series with the third switch in $S_3$. The diode $D_{10}$ may be connected in series with the fourth switch in $S_4$. Alternatively or in addition, the power inverter may include switch circuitry (identified as 602 and 604 in FIG. 6). The switch circuitry may include a series connection of a diode and a MOSFET.

The invention is inclusive of combinations of the aspects described herein. References to "a particular aspect" and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. An auxiliary resonant soft-edge pole inverter circuit, comprising:
   a first pair of capacitors connected in parallel with a corresponding pair of main power switching modules, each power switching module comprising a switch and a diode in parallel and sharing a common central node with the first pair of capacitors;
   a first pair of auxiliary switches directly connected in series with a first pair of inductors, respectively, to generate resonant current from a DC power source, the first pair of inductors also sharing the common central node;
   a second pair of auxiliary switches directly connected in series with a second pair of capacitors, respectively, the second pair of auxiliary switches also sharing the common central node, the auxiliary resonant soft-edge pole inverter circuit producing an alternating current output at the common central node;
   a second pair of diodes connected between the second pair of auxiliary switches and the first pair of inductors, respectively;
   a third pair of diodes connected in parallel with the second pair of auxiliary switches, respectively, and directly connected to the common central node;
   a fourth pair of diodes directly connected between the second pair of auxiliary switches and the DC power source, respectively; and
   a fifth pair of diodes directly connected in series with the first pair of auxiliary switches, respectively.

2. The auxiliary resonant soft-edge pole inverter circuit of claim 1, wherein at least one switch among the first pair of the switches and the second pair of switches comprises an insulated-gate bipolar transistor.

3. The auxiliary resonant soft-edge pole inverter circuit of claim 1, wherein at least one switch among the first pair of the switches and the second pair of switches comprise a metal-oxide-semiconductor field-effect transistor (MOSFET).

4. A power inverter circuit, comprising:
   a plurality of capacitors comprising a first capacitor, a second capacitor, a third capacitor, and a fourth capacitor;
   a plurality of switches comprising a first switch, a second switch, a third switch, a fourth switch, a fifth switch, and a sixth switch;
   a plurality of inductors comprising a first inductor and a second inductor; and
   a plurality of diodes comprising a first diode, a second diode, a third diode, a fourth diode, a fifth diode, a sixth diode, a seventh diode, an eight diode, a ninth diode, and a tenth diode,
   wherein the first switch is connected in parallel with the first capacitor and the first diode, and the second switch is connected in parallel with the second capacitor and the second diode,
   wherein the third switch is directly connected in series with the first inductor and the fourth switch is directly connected in series with the second inductor,
   wherein the fifth switch is directly connected in series with the third capacitor and the sixth switch is directly connected in series with the fourth capacitor,
   wherein the first and second switches, the first and second diodes, the first and second capacitors, the first and second inductors, and the fifth and sixth switches share a common node,
   wherein the third diode is connected between the third switch and the first inductor, and the fourth diode is connected between the second inductor and the fourth switch,
   wherein the fifth diode is connected in parallel with the fifth switch and the sixth diode connected in parallel with the sixth switch, the fifth and sixth diodes both directly connected to the common node,
   wherein the seventh diode is directly connected between the fourth switch and a DC power source, and the eighth diode is directly connected between the third switch and the DC power source, and
   wherein the ninth diode is directly connected in series with the third switch, and the tenth diode is directly connected in series with the fourth switch.

5. The power inverter circuit of claim 4, wherein at least one of the plurality of switches comprises an insulated-gate bipolar switches.

6. The power inverter circuit of claim 4, wherein at least one of the plurality of switches comprise a metal-oxide-semiconductor field-effect transistor (MOSFET).

* * * * *